(12) United States Patent
Toriumi et al.

(10) Patent No.: US 7,062,170 B2
(45) Date of Patent: Jun. 13, 2006

(54) OPTICAL COMMUNICATION SYSTEM

(75) Inventors: Yoichi Toriumi, Tokyo (JP); Kuninori Shino, Tokyo (JP)

(73) Assignee: Sony Corporation, Tokyo (JP)

( * ) Notice: Subject to any disclaimer, the term of this patent is extended or adjusted under 35 U.S.C. 154(b) by 724 days.

(21) Appl. No.: 10/216,971

(22) Filed: Aug. 12, 2002

(65) Prior Publication Data

US 2003/0039002 A1    Feb. 27, 2003

(30) Foreign Application Priority Data

Aug. 14, 2001    (JP) .......................... P2001-246173

(51) Int. Cl.
*H04J 14/00*    (2006.01)

(52) U.S. Cl. ...................... 398/67; 398/38; 372/29.01; 372/29.011; 372/29.012; 372/38.01

(58) Field of Classification Search ............. 372/29.01, 372/29.011, 29.012, 29.014, 38.01, 38.08, 372/38.1; 398/67, 38
See application file for complete search history.

(56) References Cited

U.S. PATENT DOCUMENTS 6,233,080 B1 *  5/2001  Brenner et al. ............. 398/196
6,490,064 B1 * 12/2002  Sakamoto et al. ............ 398/81

* cited by examiner

*Primary Examiner*—David C. Payne
(74) *Attorney, Agent, or Firm*—Frommer Lawrence & Haug; William S. Frommer; Thomas F. Presson

(57) ABSTRACT

An optical communication system suitable for full duplex optical communication between a first and a second optical transceiver units, connected with each other by a single-core optical fiber. The first and second transceiver units may have different types of light emitting elements emitting light having different loss rates in the single-core optical fiber. The system enables stable full duplex communication without setting up large scale or costly transmission units by relatively reducing the optical crosstalk involved. The first optical transceiver unit provides transmission light to be coupled with the single-core optical fiber with the intensity in the range of TAmin–TAmax. The amount of light emitted from the light emitting element of the optical transceiver unit to be coupled with the single-core optical fiber is in the range TBmin–TBmax, which amount may be adjusted by a light emission adjusting unit provided in the optical transceiver unit.

10 Claims, 10 Drawing Sheets

LNA(sin α) FOR LIGHT
EMITTING ELEMENT 221

LNA(sin α) FOR LIGHT
EMITTING ELEMENT 231

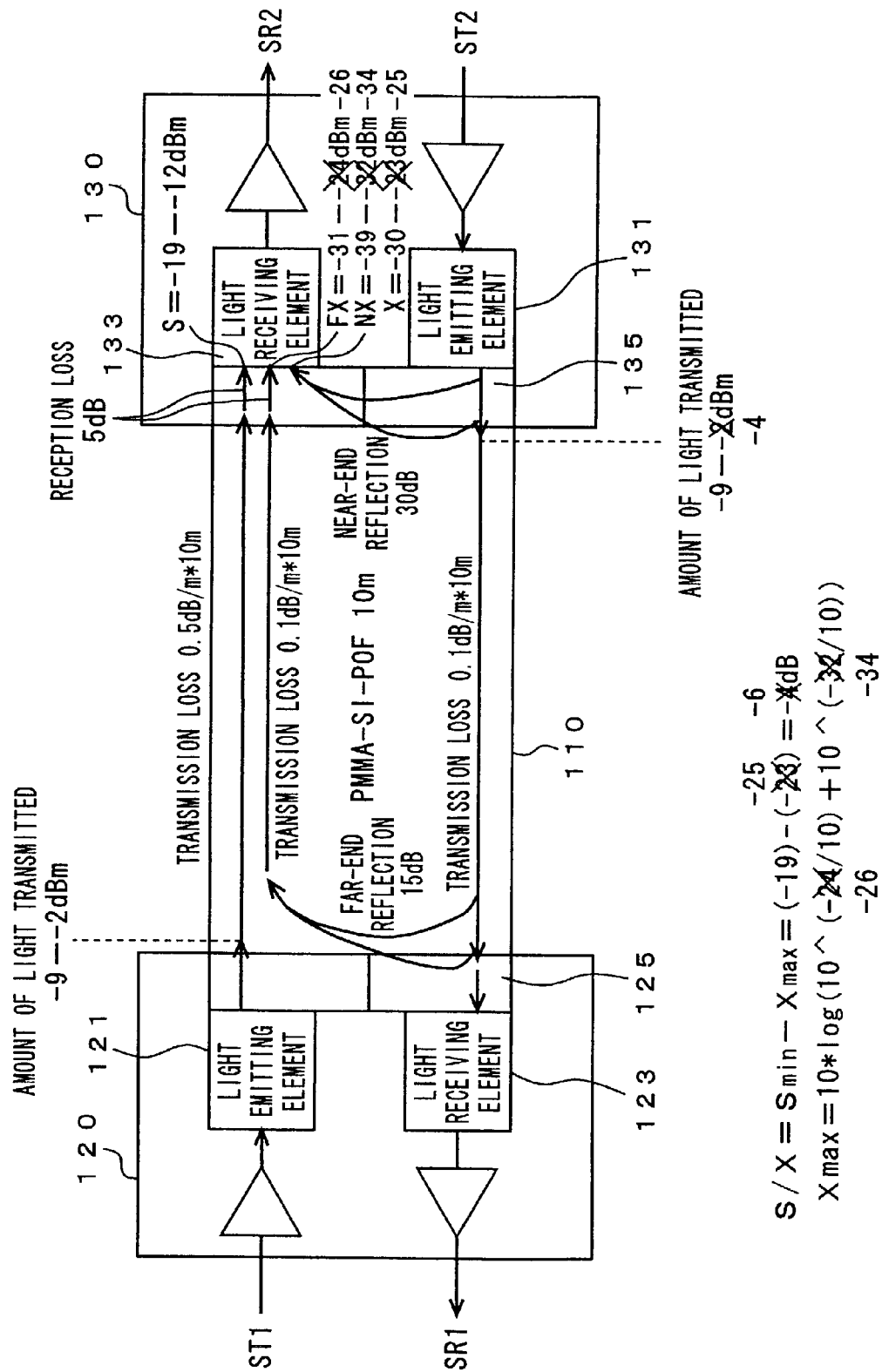

OPTICAL COMMUNICATION SYSTEM

BACKGROUND OF THE INVENTION

1. Field of Invention

The invention relates to an optical communication system for performing full duplex communication. More particularly, the invention relates to an optical communication system for performing full duplex communication connecting a first and a second optical transceiver units connected with each other by means of a single-core optical fiber.

2. Description of the Related Art

An optical communication system has been proposed which includes a first and a second optical transceiver units connected with each other by a single-core optical fiber to maintain full duplex communications between them. FIG. 1 illustrates such an optical communication system 200 as mentioned above.

The optical communication system 200 consists of a single-core optical fiber 210, an optical transceiver unit 220 connected to one end of the single-core optical fiber 210, and another optical transceiver unit 230 connected to the other end of the single-core optical fiber 210.

The optical transceiver unit 220 has:
a light emitting element 221 for emitting transmission light;
a drive circuit 222 for driving the light emitting element 221 in response to a transmission signal ST1;
a light receiving element 223 for receiving transmission light from light emitting element 231 of the optical transceiver unit 230;
an amplifier 224 for amplifying signal light SR1 received by the light receiving element 223; and
a guiding means 225 such as a prism for guiding the transmission light from the light emitting element 221 to the single-core optical fiber 210 and for guiding the received light from the single-core optical fiber 210 to the light receiving element 223.

The optical transceiver unit 230 has:
the light emitting element 231 for emitting transmission light;
a drive circuit 232 for driving the light emitting element 231 in response to a transmission signal ST2;
a light receiving element 233 for receiving transmission light from light emitting element 221 of the optical transceiver unit 220;
an amplifier 234 for amplifying signal light SR2 received by the light receiving element 233; and
a guiding means 235 for guiding the transmission light from the light emitting element 231 to the single-core optical fiber 210 and for guiding the received light from the single-core optical fiber 210 to the light receiving element 233.

Operations of the full duplex optical communication system 200 as shown in FIG. 1 are as follows.

A beam of transmission light is emitted from the light emitting element 221 of the optical transceiver unit 220 in response to the transmission signal ST1, which is guided by the guiding means 225 to one end (proximal end) of the single-core optical fiber 210 adjacent the optical transceiver unit 220. The light is further transmitted through the single-core optical fiber 210 to the other end (distal end) thereof adjacent the optical transceiver unit 230 and guided to the light receiving element 233 as the received signal light by the guiding means 235 of the optical transceiver unit 230. The light receiving element 233 provides a signal SR2 associated with the signal light received.

On the other hand, a beam of transmission light is also emitted from the light emitting element 231 of the optical transceiver unit 230 associated with a transmission signal ST2. The light is then guided by the guiding means 235 to the proximal end of the single-core optical fiber 210 adjacent the optical transceiver unit 230. The transmission light is passed through the single-core optical fiber 210 to the distal end thereof, and guided as the received signal light by the guiding means 225 to the light receiving element 223 of the optical transceiver unit 220. The light receiving element 223 provides a signal SR1 associated with the received signal light.

It is said in the example above that the light receiving element 233 of the optical transceiver unit 230 receives the signal light (referred to as optical reception signal) transmitted from the light emitting element 221 of the optical transceiver unit 220. In actuality, however, the light receiving element 233 also receives crosstalk component contained in the optical reception signal. This crosstalk results from reflection of the light emitted by the light emitting element 231 of the optical transceiver unit 230. This is also the case with the optical reception signal received by the light receiving element 223 of the optical transceiver unit 220.

Such optical crosstalk includes near-end optical crosstalk (NX-talk) and far-end optical crosstalk (FX-talk). The NX-talk results from the reflection of the incident transmission light by the proximal end of the single-core optical fiber 210 back to the very optical transceiver unit that emitted the transmission light. The FX-talk results from the reflection of the exiting transmission light at the distal end of the single-core optical fiber 210 back to that optical transceiver unit.

The optical crosstalk will be further discussed in detail with reference to FIG. 2. Of the light transmitted from the optical transceiver unit 220 to the optical transceiver unit 230, the amount of light received (i.e. detected) by the light receiving element 233 of the optical transceiver unit 230 is given by Equation (1) below.

$$S(\text{dBm}) = TA(\text{dBm}) - La(\text{dB/m}) * D(m) - LR(\text{dB}) \quad (1)$$

where TA(dBm) is the amount of light transmitted from the optical transceiver unit 220 to the single-core optical fiber 210, La (dB/m) is the amount of light dissipated in the single-core optical fiber 210 during its transmission through it, D(m) is the length of the single-core optical fiber 210, and LR(dB) is the reception loss or the amount of light that has exited the single-core optical fiber 210 but lost before entering the light receiving element 233.

Of the transmission light emitted from the optical transceiver unit 230 to the optical transceiver unit 220, the amount of FX-talk, i.e. the transmission light reflected at the distal end back to the light receiving element 233 of the optical transceiver unit 230, is given by Equation (2) below.

$$FX(\text{dBm}) = TB(\text{dBm}) - Lb(\text{dB/m}) * D(m) - LF(\text{dB}) - Lb(\text{dB/m}) * D(m) - LR(\text{dB}) \quad (2)$$

$$= TB(\text{dBm}) - 2 * Lb(\text{dB/m}) * D(m) - LF(\text{dB}) - LR(\text{dB})$$

where TB(dBm) is the amount of light emitted from the optical transceiver unit 230 and coupled with the single-core optical fiber 210, Lb(dB/m) is the amount of light lost during the transmission through the single-core optical fiber 210, and LF(dB) is the amount of light reflected at the distal end of the single-core optical fiber 210, resulting in the FX-talk.

The amount of NX-talk detected by the light receiving element 233 of the optical transceiver unit 230, i.e. the light emitted from the optical transceiver unit 230 to the optical transceiver unit 220 but reflected at the proximate end of the single-core optical fiber 210, is given by Equation (3) below.

$$NX(\text{dBm}) = TB(\text{dBm}) - LN(\text{dB}) \quad (3)$$

where LN(dB) is the amount of light reflected at the proximal end of the single-core optical fiber 210 backward and lost before detected by the light receiving element 233.

The total amount X of crosstalk component detected by the light receiving element 233 of the optical transceiver unit 230 is obtained from Equations (2) and (3) as $$\begin{aligned}X(\text{dBm}) &= 10 * \text{LOG}(10 \wedge (FX(\text{dBm})/10) + 10 \wedge (NX(\text{dBm})/10)) \quad (4)\\ &= 10 * \text{LOG}(10 \wedge ((TB - 2*Lb*D - LF - LR)10) +\\ &\quad 10 \wedge ((TB - LN)/10))\end{aligned}$$

It is noted that when the light loss La (dB/m) is larger than the light loss Lb (dB/m), the amount of light received, S (dBm), as given by Equation (1) decreases relatively, so that the amount of the crosstalk X as determined by Equation (4) increases relatively.

As an example, light loss La (dB/m) can be larger than light loss Lb (dB/m) when the power spectra of the light emitting elements 221 and 231 have different spectral widths in wavelength. For example, given a single-core optical fiber 210 characterized by a low transmission loss window over a wavelength band as shown in FIG. 3C, the width of the power spectrum of the light emitting element 221 is wider than the window as shown in FIG. 3A while the width of the power spectrum of the light emitting element 231 is narrower than the window as shown in FIG. 3B. This can happen when a light emitting diode is used for the light emitting element 221 and a laser diode is used for the light emitting element 231.

The light loss La (dB/m) can be larger than the light loss Lb (dB/m) also in the event that the peak wavelength of the light emitted from the light emitting element 221 varies greatly as compared with that of the light emitted from the light emitting element 231. For example, given a single-core optical fiber 210 having a low transmission loss spectrum as shown in FIG. 4, the peak wavelength of light emitted from the light emitting element 221 greatly varies with temperature as shown in FIG. 4A, while the wavelength of light emitted from the light emitting element 231 is not so as shown in FIG. 4B.

As another example, light loss La (dB/m) can be larger than light loss Lb (dB/m) when the wavelengths of light emitted by the light emitting elements 221 and 231 are not the same. This is also the case when the single-core optical fiber 210 has a transmission loss spectrum over a range as shown in FIG. 5C, the (peak) wavelength of the light emitted from the light emitting element 221 is short (e.g. at or near the lower end of the range) as shown in FIG. 5A, while the wavelength of the light emitted from the light emitting element 231 is long (e.g. at or near the upper end of the range) as shown in FIG. 5B.

As a further example, light loss La (dB/m) can be larger than light loss Lb (dB/m) when the launched numerical apertures (LNA) for the incident light emitted from the light emitting elements 221 and 231 to the single-core optical fiber 210 are different. For example, LNA (=sin α) for the light emitting element 221 as shown in FIG. 6A is smaller than that for the light emitting element 231 as shown in FIG. 6B.

As described above, the signal components fed to the respective light receiving elements 223 and 233 of the respective optical transceiver units 220 and 230 are weakened by the crosstalk components contained in the signal light. In addition, the signal components are influenced by a Gaussian noise. Hence, the aperture phase margin therefor is appreciably reduced.

Referring now to FIGS. 7A-9B, harmful influences of optical crosstalk on the reception eye pattern of a signal received will be discussed.

FIGS. 7A and 7B show reception eye patterns not influenced by any optical crosstalk component. In this instance, received signal light supplied to the light receiving elements contain only signal components, as seen in FIG. 7A. Thus, the reception eye patterns are determined solely by the signal components, as shown in FIG. 7B.

FIGS. 8A and 8B show reception eye patterns slightly influenced by optical crosstalk. In this instance, received signal light supplied to the respective light receiving elements contain appreciable amounts of optical crosstalk component, as shown in FIG. 8A. Hence, the reception eye pattern of a received signal has a high level (H) and a low level (L) slightly offset from the levels shown in FIG. 8a by the crosstalk component, as shown in FIG. 8B.

FIGS. 9A and 9B show an optical communication system involving a significant amount of optical crosstalk. In this instance, the light supplied to each of the light receiving elements contains significant crosstalk component as seen in FIG. 9A. Consequently, the high level (H) and the low level (L) of the reception eye pattern, are significantly offset by the crosstalk component, as shown in FIG. 9B.

In addition, a Gaussian noise is superposed on each of the high level H and the low level L of the reception eye pattern, as shown in FIGS. 7B, 8B, and 9B. The Gaussian noise is the root mean square (rms) of different types of noise generated by the circuit elements involved including the light emitting elements and amplifiers.

A bit error rate (BER) of the signal received is conventionally determined by Equation (5) below, based on an assumption that both the high level H and the low level L of the reception eye pattern are superposed with the Gaussian noise, $$\begin{aligned}BER &= \frac{1}{2}\int_{-\infty}^{D} \frac{1}{\sigma\sqrt{2\pi}} \exp\left(-\frac{(H-x)^2}{2\sigma^2}\right) dx + \\ &\quad \frac{1}{2}\int_{D}^{\infty} \frac{1}{\sigma\sqrt{2\pi}} \exp\left(-\frac{(x-L)^2}{2\sigma^2}\right) dx \\ &= \int_{D}^{\infty} \frac{1}{\sigma\sqrt{2\pi}} \exp\left(-\frac{(x-L)^2}{2\sigma^2}\right) dx \\ &= \int_{\frac{H-L}{2\sigma}}^{\infty} \frac{1}{\sqrt{2\pi}} \exp\left(-\frac{y^2}{2}\right) dy \\ &= \frac{1}{\sqrt{2\pi}} \int_{Q}^{\infty} \exp\left(-\frac{y^2}{2}\right) dy\end{aligned} \quad (5)$$

where y and Q are defined by the following formula.

$$y = \frac{x-L}{\sigma} \text{ and } Q = \frac{H-L}{2\sigma}$$

For simplicity, it is assumed in Equation (5) that the standard deviations σ of the Gaussian noise superposed on the high level H and the low level L are the same. In Equation (5), the bit error rate is defined to be the ratio of the overlapping area of two Gaussian noise distributions appearing at the high and lower levels, to the entire area occupied by the two distributions.

As discussed above, the larger the optical crosstalk, the lager are the offset of the H and L levels. Consequently, the aperture phase margin for the bit error rate smaller than $10^{-\alpha}$ ($\alpha=12$ for example) decreases with the amount of the crosstalk component.

It is therefore an object of the present invention to provide an optical communication system enabling stable full duplex communication with relatively reduced optical crosstalk, without requiring large-scale or costly transceiver units.

SUMMARY OF THE INVENTION

In one aspect of the invention, there is provided a full duplex optical communication system, comprising a first and a second optical transceiver units connected with each other by a single-core optical fiber. The first optical transceiver unit includes a first light emitting element for emitting transmission light, a first light receiving element for receiving signal light, and first guiding means for guiding the transmission light from the first light emitting element to the single-core optical fiber and for guiding received signal light from the single-core optical fiber to the first light receiving element.

The second optical transceiver unit includes a second light emitting element for emitting transmission light, a second light receiving element for receiving signal light; and second guiding means for guiding the transmission light from the second light emitting element to the single-core optical fiber and for guiding received signal light from the single-core optical fiber to the second light receiving element.

The optical communication system further comprises means for relatively reducing optical crosstalk component. The optical crosstalk component is the optical crosstalk component originating from the first light emitting element and contained in the signal light received by the first light receiving element or the optical crosstalk component originating from the second light emitting element and contained in the signal light received by the second light receiving element by adjusting at least one of the amounts of light emitted from the first and second light emitting elements to the single-core optical fiber.

In the embodiment shown herein, the first and the second optical transceiver units are connected with each other by a single-core optical fiber for full duplex communication.

Light received by the first light receiving element of the first optical transceiver unit contains crosstalk component that arises from the reflection of the light transmitted from the light emitting element of the first optical transceiver unit. The crosstalk component may be reduced, relative to the associated signal component, by adjusting either one or both of the amounts of the light transmitted from the first and the second light emitting elements of the respective optical transceiver units. For example, the crosstalk component can be relatively reduced by reducing the amount of light (i.e. the emission power) transmitted from the first light transceiver unit. Crosstalk component contained in the light received by the second light receiving element may be relatively reduced in the same manner.

In the event that, due to dissipation in the single-core optical fiber, the loss of transmission light emitted from the light emitting element of one optical transceiver unit to the single-core optical fiber is larger than the corresponding loss of light emitted from the other light emitting element to the single-core optical fiber, the amount of crosstalk component increases relative to the signal component in the light fed to the light receiving element of the other optical transceiver unit. In this instance, the relative mount of the optical crosstalk component can be reduced by reducing the amount of the light emitted from the light emitting element of the other optical transceiver unit. This can be done by simply limiting the maximum amount of light emitted from the other optical transceiver unit below a certain maximum level, without altering the minimum level of the signal component fed to the light receiving element of the one optical transceiver unit or spoiling the signal-to-crosstalk ratio of the light receiving element of the one optical transceiver unit.

BRIEF DESCRIPTION OF THE DRAWINGS

Embodiments of the invention will now be described in detail by way of example with reference to the accompanying drawings, in which:

FIGS. 3A-3C illustrate each of three different types of emission spectra of light emitting elements having different spectral widths in wavelength, wherein FIG. 3A shows power spectrum of light emitting element 221, FIG. 3B shows power spectrum of light emitting element 231, and FIG. 3C shows a transmission loss spectrum in a single-core optical fiber connecting the light emitting elements;

FIGS. 4A and 4B illustrate emission spectra of two light emitting elements having different wavelength variations, wherein FIG. 4A shows power spectrum of light emitting element 221, and FIG. 4B shows power spectrum of light emitting element 231.

FIGS. 5A and 5B illustrate emission spectra of two light emitting elements having different wavelengths, wherein FIG. 5A shows power spectrum of light emitting element 221, and FIG. 5B shows power spectrum of light emitting element 231.

FIG. 12 shows an improved full duplex optical communication system of the invention less affected by optical crosstalk.

Like or corresponding elements are indicated by like or corresponding reference numerals throughout the drawings.

DETAILED DESCRIPTION OF THE INVENTION

Figure 1:
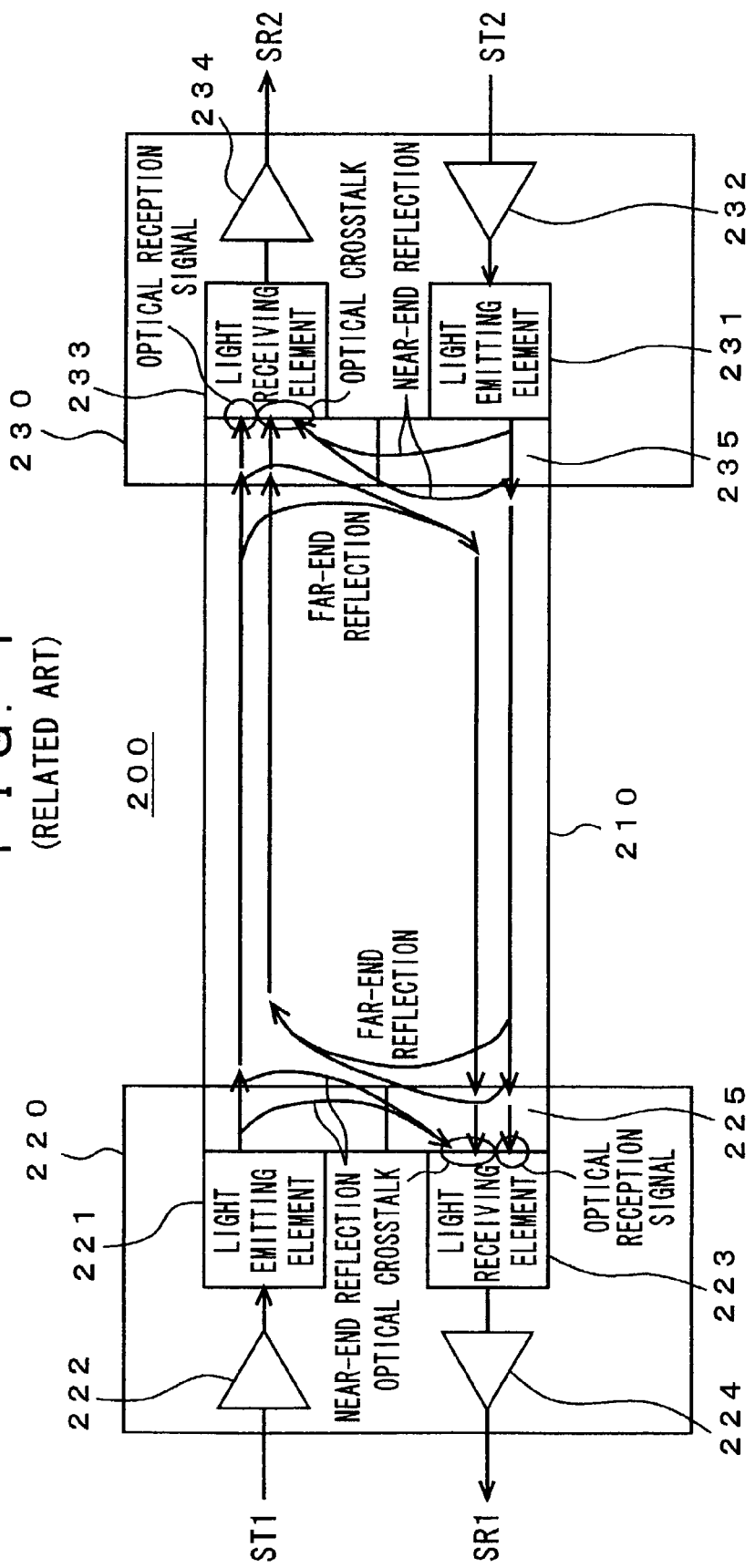
FIG. 1 is a schematic view of a conventional full duplex optical communication system establishing communications through a single-core optical fiber.
Figure 2:
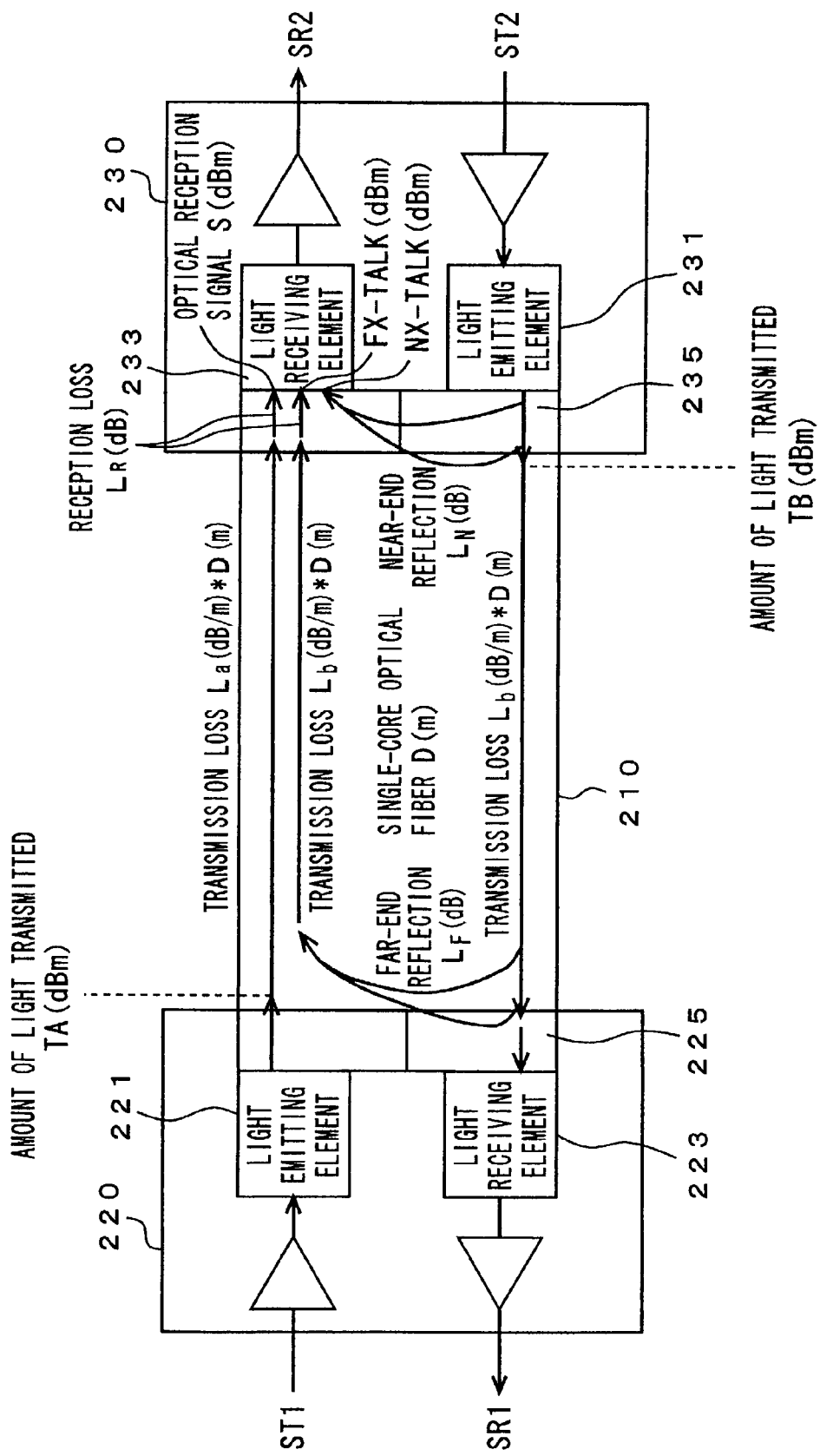
FIG. 2 is a diagram representation of optical crosstalk that takes place in the full duplex communication system as shown in FIG. 1.
Figure 3A:
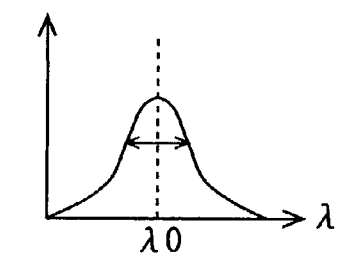
Figure 3B:
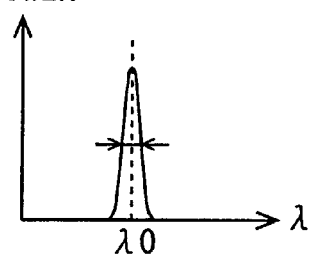
Figure 3C:
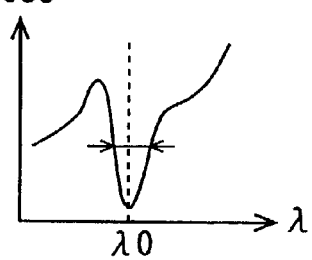
Figure 4A:
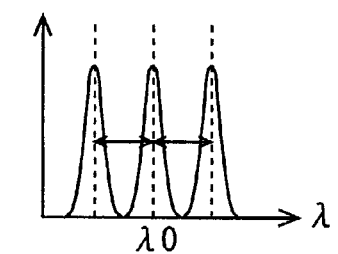
Figure 4B:
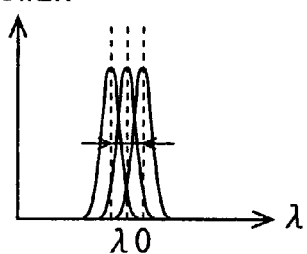
Figure 4C:
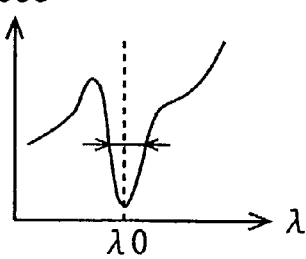
FIG. 4C shows a transmission loss spectrum in a single-core optical fiber connecting the light emitting elements.
Figure 5A:
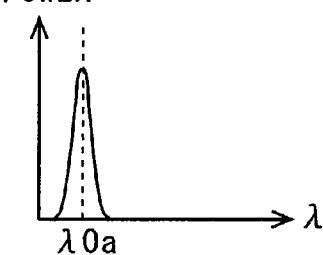
Figure 5B:
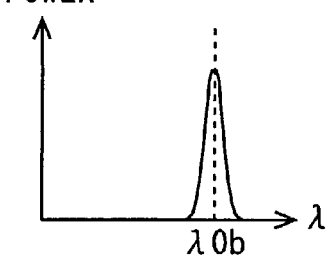
Figure 5C:
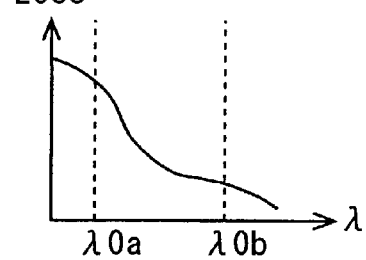
FIG. 5C illustrates a transmission loss spectrum of a single-core optical fiber connecting the two light emitting elements.
Figure 6A:
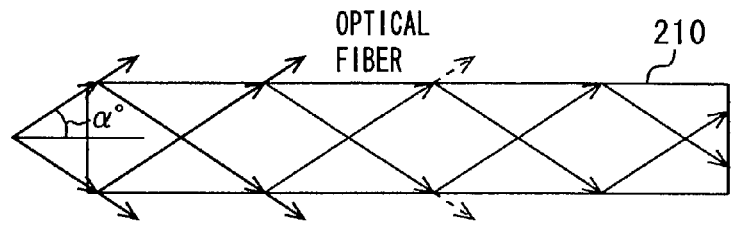
FIGS. 6A and 6B illustrate launched numerical apertures (LNA) for the light emitted from two different light emitting elements.
Figure 6B:
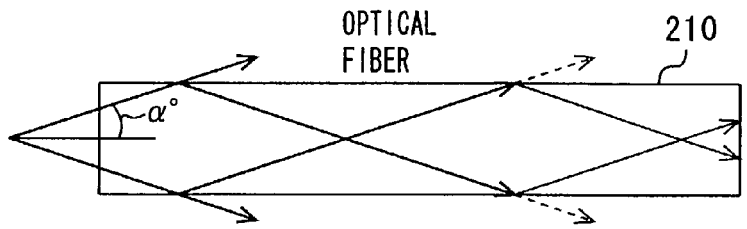
Figure 7A:
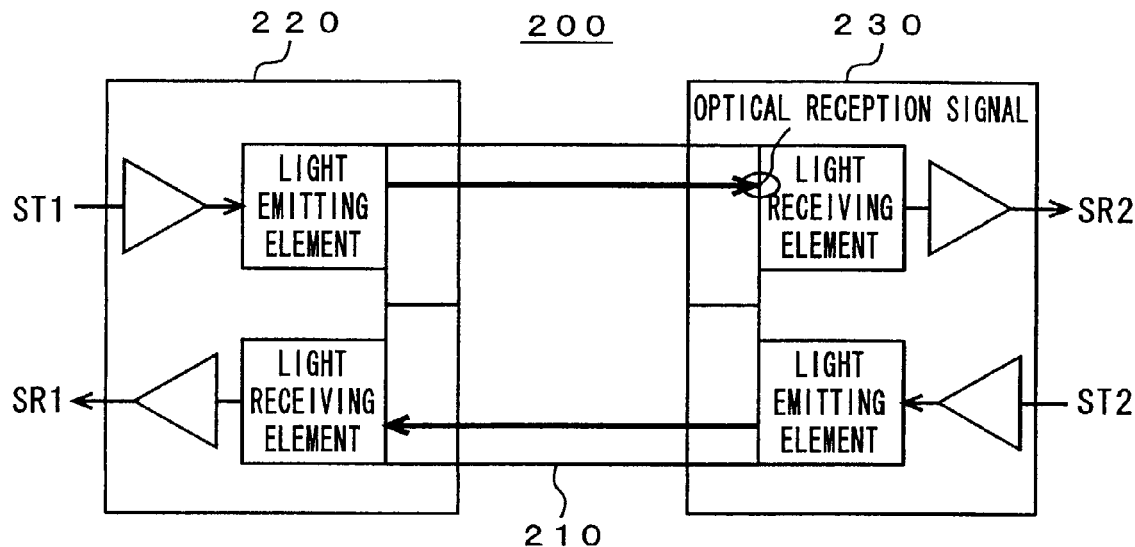
FIG. 7A illustrates a full duplex communication system not affected by optical crosstalk.
Figure 7B:
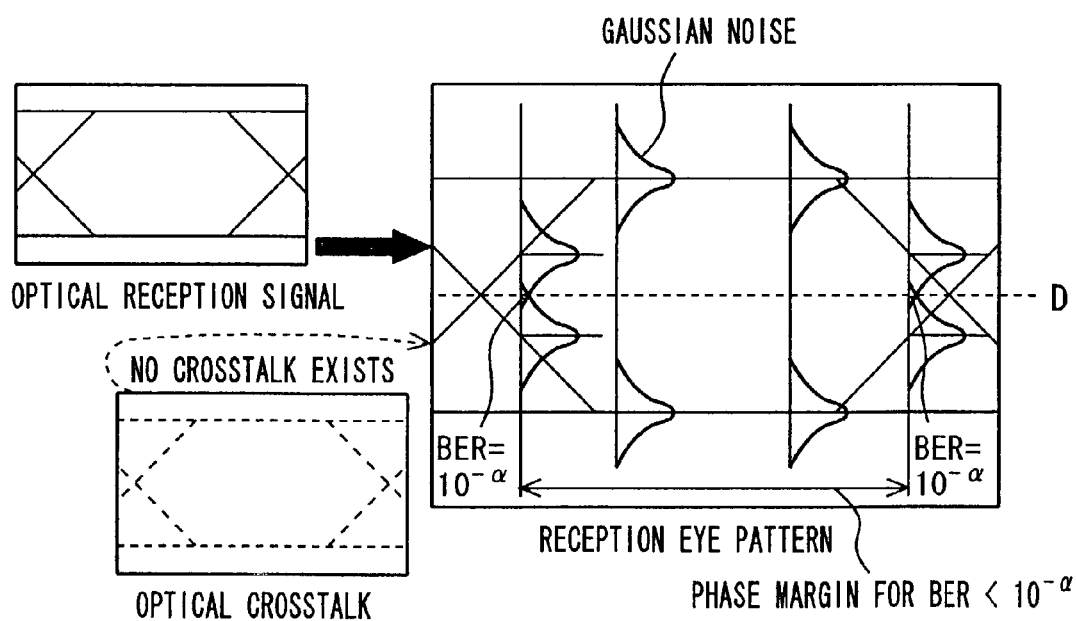
FIG. 7B illustrates influences of the optical crosstalk on the reception eye pattern of a received signal.
Figure 8A:
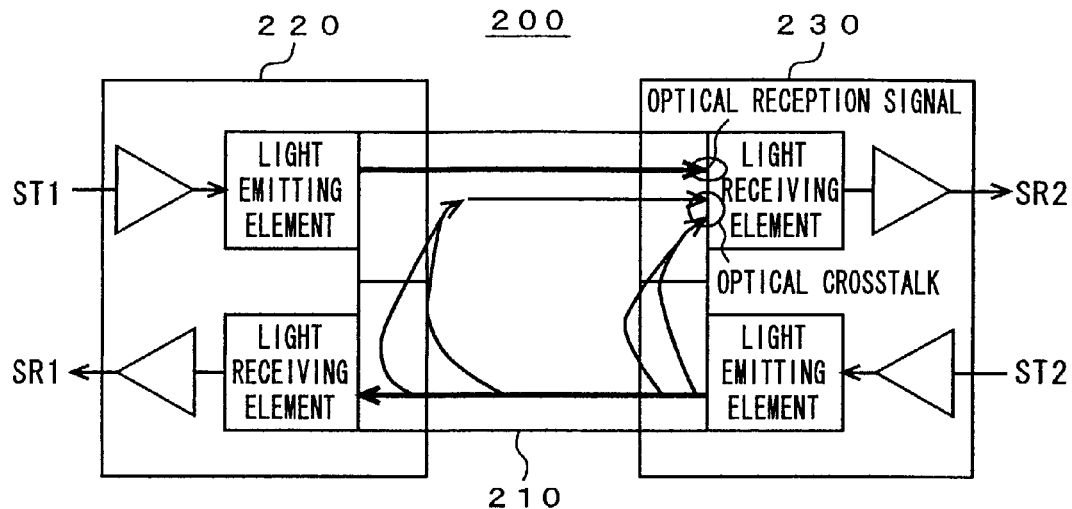
FIG. 8A illustrates a full duplex communication system slightly affected by optical crosstalk.
Figure 8B:
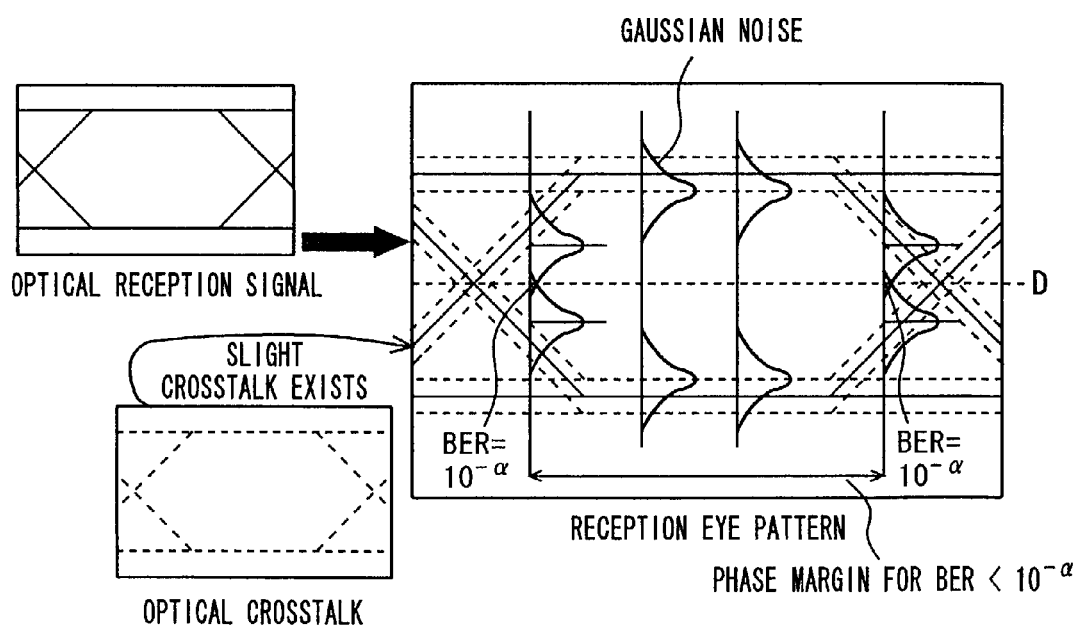
FIG. 8B shows its reception eye pattern influenced by the optical crosstalk.
Figure 9A:
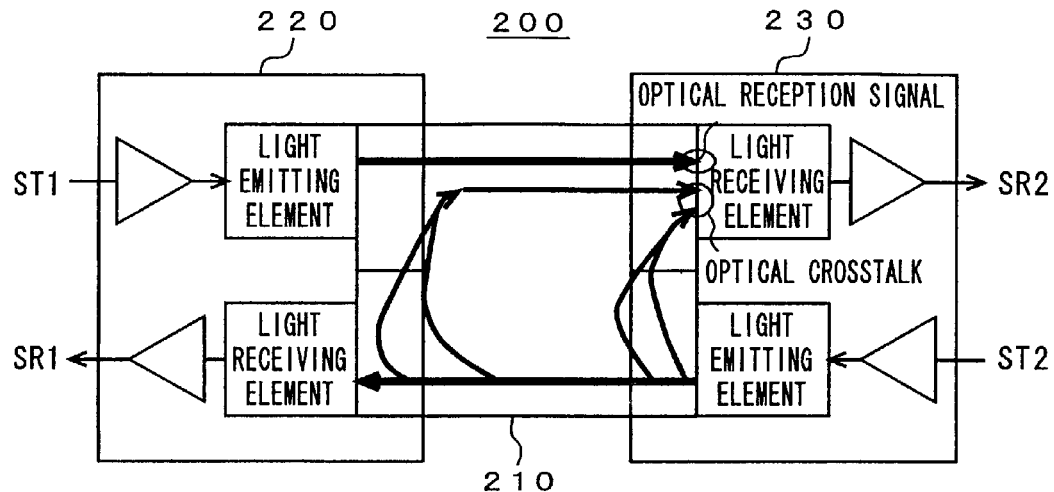
FIG. 9A illustrates a full duplex system significantly affected by optical crosstalk.
Figure 9B:
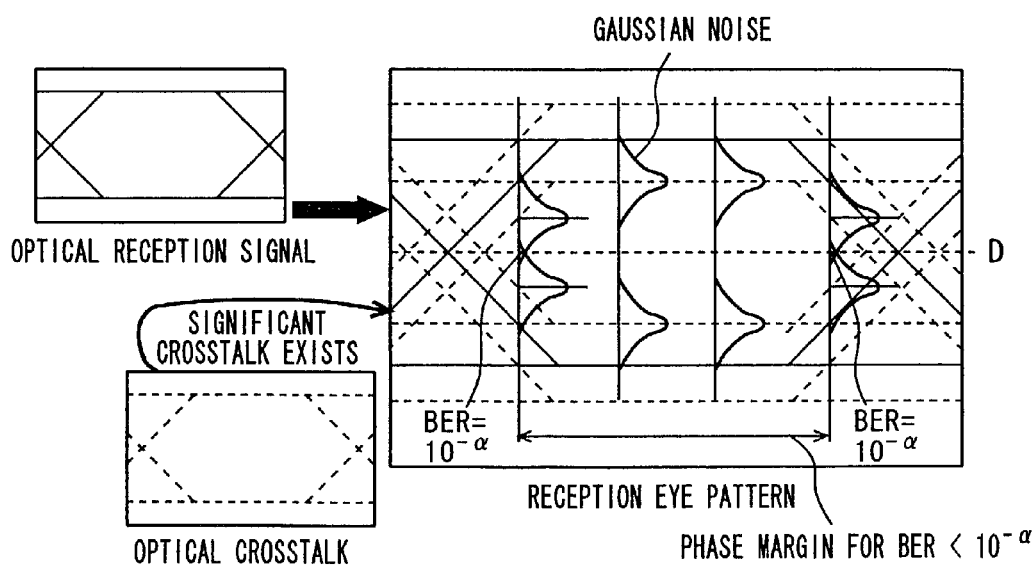
FIG. 9B shows its eye pattern influenced by the optical crosstalk.
Figure 10:
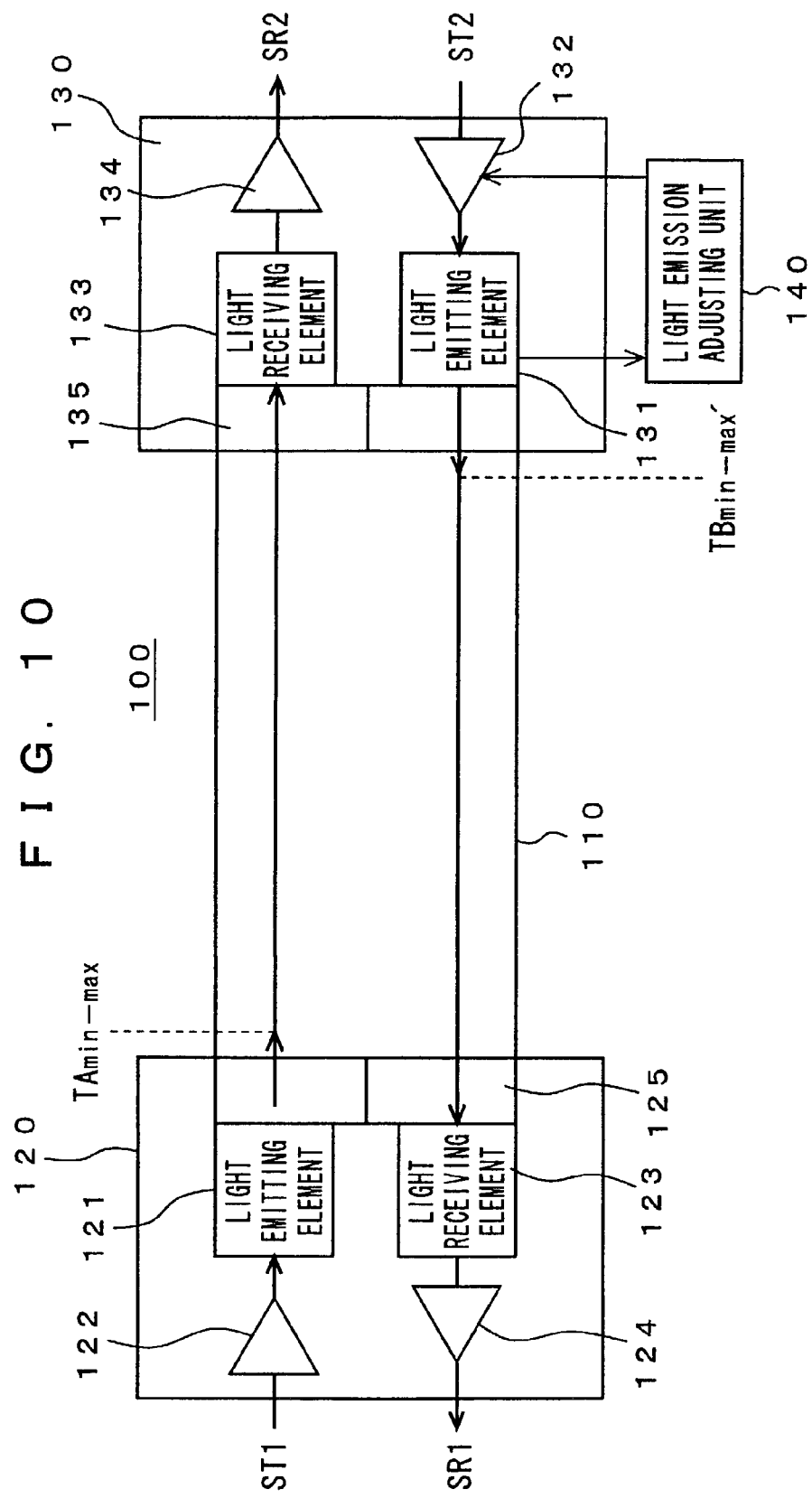
FIG. 10 is a diagram representation of a full duplex optical communication system establishing communication through a single-core optical fiber as an embodiment according to the invention.

FIG. 10 is a diagram representation of an optical communication system 100 as an embodiment according to the invention. The optical communication system 100 has a single-core optical fiber 110, a first optical transceiver unit 120 connected to one end of the single-core optical fiber 110, and a second optical transceiver unit 130 connected to the other end of the single-core optical fiber 110.

The optical transceiver unit 120 has:
a light emitting element 121 for emitting transmission light;
a drive circuit 122 for driving the light emitting element 121 in response to a transmission signal ST1;
a light receiving element 123 for receiving transmission light from a second light emitting element 131 of the optical transceiver unit 130;
an amplifier 124 for amplifying the signal SR1 received by the first light receiving element 123; and
guide means 125 such as a prism for guiding the transmission light from the first light emitting element 121 to the single-core optical fiber 110 and for guiding received transmission light from the single-core optical fiber 110 to the light receiving element 123.

The optical transceiver unit 130 has:
the second light emitting element 131 for emitting transmission light,
a drive circuit 132 for driving the light emitting element 131 in response to a transmission signal ST2,
a second light receiving element 133 for receiving transmission light from the first light emitting element 121 of the optical transceiver unit 120,
an amplifier 134 for amplifying signal SR2 received by the light receiving element 133; and
guide means 135 such as a prism for guiding the transmission light from the second light emitting element 131 to the single-core optical fiber 110 and for guiding received transmission light from the single-core optical fiber 110 to the second light receiving element 133.

In the embodiment shown herein, the light emitting elements 121 and 131 of the optical transceiver unit 120 and 130, respectively, emit light of the same wavelength. The light emitting element 121 may be a light emitting diode for example, while the second light emitting element 131 may be a laser diode for example.

The optical transceiver unit 120 can emit transmission light to the single-core optical fiber 110 in a range TAmax–min.

The optical transceiver unit 130 can emit transmission light to the single-core optical fiber 110 in a range TBmin–max when its light emitting element 131 is not adjusted. According to this embodiment, the light emitting element 131 is actually adjusted by a light emission adjusting unit 140 provided in the second optical transceiver unit 130 so that the maximum amount of light emitted therefrom will not exceed a level TBmax' (TBmax'<TBmax).

The light emission adjusting unit 140 monitors the rearward emission of light emitted from the laser diode as the light emitting element 121 to control the drive circuit 132 through a feedback loop, maintaining the amount of the rearward emission at a predetermined level and limiting the maximum emission of light by the light emitting element 121 below TBmax'.

The operations of the full duplex optical communication system 100 shown in FIG. 10 will now be described.

A beam of light associated with a transmission signal ST1 is emitted from the first light emitting element 121 of the optical transceiver unit 120, which beam is guided therefrom to a proximal end of the single-core optical fiber 110 of the optical transceiver unit 120 by the guide means 125. The light is transmitted through the single-core fiber 110, to the opposite or distal end thereof adjacent the optical transceiver unit 130, and guided by the guide means 135 to the light receiving element 133 of the optical transceiver unit 130. The light receiving element 133 provides received signal SR2 associated with the signal light it received.

On the other hand, another beam of light associated with a transmission signal ST2 is emitted from the light emitting element 131 of the optical transceiver unit 130, which beam is guided by the guide means 135 to the proximal end of the single-core optical fiber 110 adjacent the optical transceiver unit 130. The light is transmitted through the single-core optical fiber 110 to the opposite (distal) end thereof, and guided therefrom by the guide means 125 as the signal light to the light receiving element 123 of the optical transceiver unit 120. Upon receipt of the signal light, the light receiving element 123 provides received signal SRI associated with it.

Incidentally, the light receiving element 133 of the optical transceiver unit 130 has been described above to receive the transmission light (optical reception signal component) emitted from the light emitting element 121 of the optical transceiver unit 120. In actuality, in addition to the reception signal component, the optical transceiver unit 130 also receives optical crosstalk component arising from the reflections of the transmission light emitted from the light emitting element 131 of the optical transceiver unit 130. This is also the case in the reception of light by the light receiving element 123 of the optical transceiver unit 120.

Such optical crosstalk includes near-end optical crosstalk (referred to as NX-talk) and far-end optical crosstalk (referred to as FX-talk). The NX-talk arises from the incident light reflected backward at the proximal or near end of the single-core optical fiber 110. The FX-talk arises from the reflection of the exiting light backward at the distal or far end of the single-core optical fiber 110.

Figure 11:
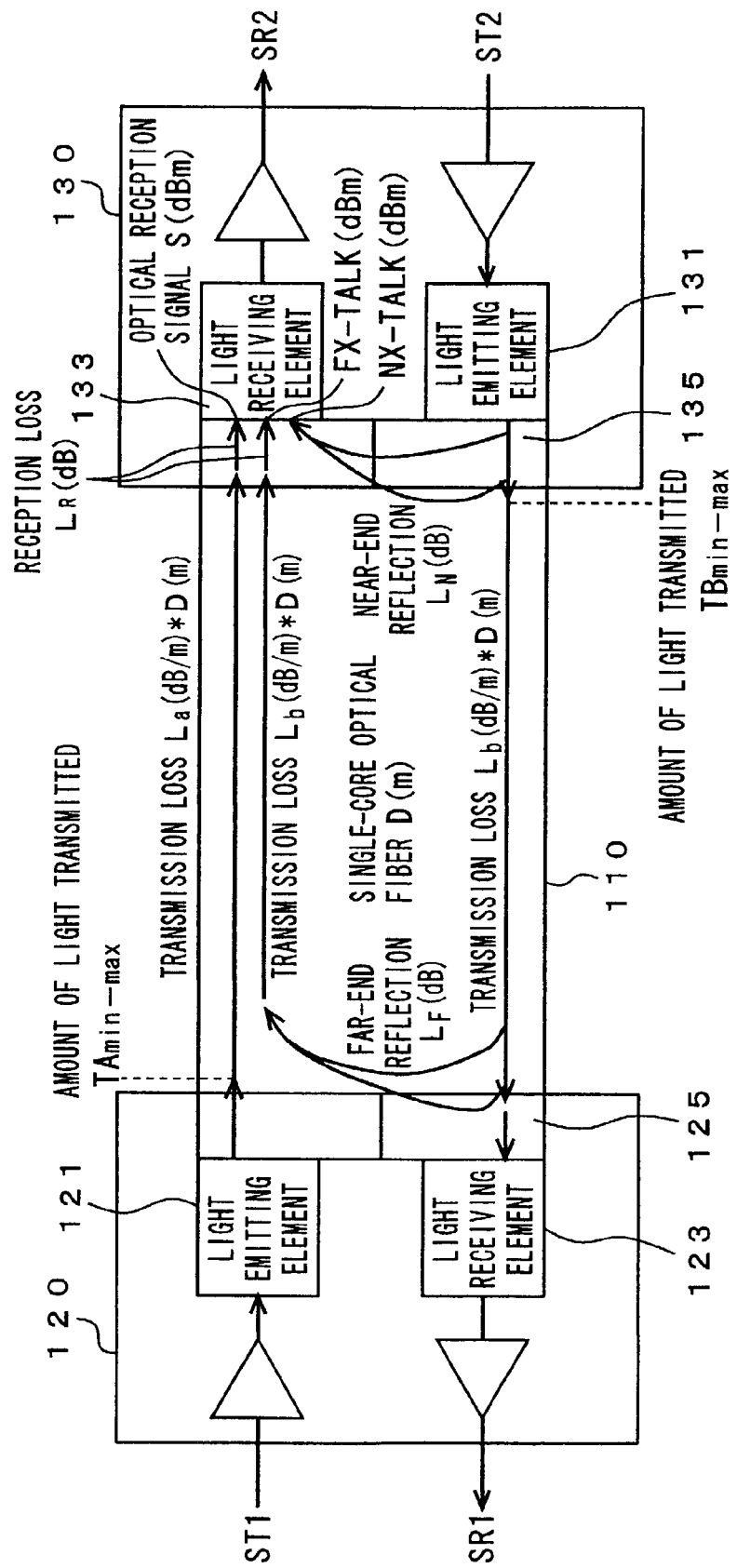
FIG. 11 illustrates details of optical crosstalk involved in a full duplex optical communication system.

The optical crosstalk will be further described in detail with reference to FIG. 11. Of the light transmitted from the optical transceiver unit 120 to the second optical transceiver unit 130, the amount of light S detected by the light receiving element 133 of the second optical transceiver unit 130, for example, is given by Equation (6) below.

$$S \text{ (dBm)} = TA\text{min–max (dBm)} - La \text{ (dB/m)} * D \text{ (m)} - LR \text{ (dB)} \quad (6)$$

where TAmin–max (dBm) is the amount of light transmitted from the optical transceiver unit 120 to the single-core optical fiber 110, La(dB/m) is the amount of light dissipated in the single-core optical fiber 110 during the transmission through it, D(m) is the length of the single-core optical fiber 110, and LR(dB) is the reception loss or the amount of light that has exited the single-core optical fiber 110 but is lost before entering the light receiving element 133.

Of the light transmitted from the optical transceiver unit 130 to the optical transceiver unit 120, the amount of light detected by the light receiving element 133 of the optical transceiver unit 130 in the form of FX-talk, i.e. the amount of light FX(dBm) reflected backward at the distal end of the single-core optical fiber, is given by Equation (7) below.

$$FX(\text{dBm}) = TB\text{min} - \max(\text{dBm}) - Lb(\text{dB/m}) * D(m) - \quad (7)$$
$$LF(\text{dB}) - Lb(\text{dB/m}) * D(m) - LR(\text{dB})$$
$$= TB\text{min} - \max(dBm) - 2 * Lb(\text{dB/m}) * D(m) -$$
$$LF(\text{dB}) - LR(\text{dB})$$

where TBmin–max(dBm) is the amount of light transmitted from the optical transceiver unit 130 to the single-core optical fiber 110 (before adjustment by the light emission adjusting unit 140), Lb (dB/m) is the amount of light dissipated in the single-core optical fiber 110 during the transmission through it, and LF (dB) is the amount of light lost by the reflection at the distal end of the single-core optical fiber 110.

Of the light transmitted from the optical transceiver unit 130 to the optical transceiver unit 120, the amount of light detected by the light receiving element 133 of the optical transceiver unit 130 in the form of NX-talk, i.e. the amount of light NX(dBm) reflected backward at the proximal end of the single-core optical fiber, is given by Equation (8) below.

$$NX \text{ (dBm)} = TB\text{min–max (dBm)} - LN \text{ (dB)} \quad (8)$$

where LN (dB) is the amount of light that was reflected backward at the proximal end of the single-core optical fiber 110 to the light receiving element 133 but lost before reaching the light emitting element 133.

The total amount of the optical crosstalk, X (dBm), detected by the light receiving element 133 is obtained by subtracting Equation (8) from Equation (7).

$$X(\text{dBm}) = 10 * \text{LOG}(10 \wedge (FX(\text{dBm})/10) + 10 \wedge (NX(\text{dBm})/10)) \quad (9)$$
$$= 10 * \text{LOG}(10 \wedge ((TB\text{min} - \max - 2 * Lb * D - LF - LR)/$$
$$10) + 10 \wedge ((TB\text{min} - \max - LN)10))$$

Hence, in the worst case, the ratio S/X of the light received as signal component, S (dBm), to the light received as optical crosstalk component, X (dBm), is given by Equation (10) below.

$$S/X = S\text{min} - X\text{max} \quad (10)$$
$$= TA\text{min} - La * D - LR - 10 * \text{LOG}(10 \wedge ((TB\text{max} -$$
$$2 * Lb * D - LF - LR)/10) + 10 \wedge ((TB\text{max} - LN)/10))$$

We now consider a case where the light loss La (dB/m) is larger than the light loss Lb (dB/m) for the reasons as discussed in connection with FIGS. 3A-6B. In this case, optical crosstalk component increases relative to the signal component because the signal component Smin decreases while Xmax increases in Equation (10), thereby deteriorating the S/X ratio.

In the embodiment shown herein, the optical transceiver unit 130 is provided with the light emission adjusting unit 140 for limiting the maximum amount of light emitted from the light emitting element 131 of the optical transceiver unit 130 to TBmax' (where TBmax'<TBmax). Since in this case the term representing the maximum amount of light TBmax in Equation (10) becomes TBmax', the optical crosstalk component are relatively reduced, so that the S/X ratio is improved accordingly.

Thus, if the light emitting elements 121 and 131 of the optical transceiver units 120 and 130, respectively, are of different type, resulting in light loss La (dB/m) being larger than light loss Lb (dB/m), good full duplex communication can be attained.

It is noted that the embodiment shown herein does not resort to optical wavelength separation devices or costly large scale optical transceiver units in order to reduce optical crosstalk component, and that the invention can be applied to instances where the light emitting elements 121 and 131 provide transmission light of the same wavelength.

Incidentally, the light emission adjusting unit 140 is adapted to limit only the maximum amount of light, Tbmax, emitted by the optical transceiver unit 130 to TBmax'. It will be appreciated that this will not affect the minimum level of the signal component transmitted to the light receiving element 123, and hence will not spoil the S/X ratio of the signal light component to the optical crosstalk component in the light transmitted from the optical transceiver unit 130 to the optical transceiver unit 120. In other words, this limitation will not damage the S/X ratio in the reverse transmission of light from the optical transceiver unit 130 to the optical transceiver unit 120.

Referring to FIG. 12, an improvement of the signal-to-optical crosstalk ratio S/X in the optical transceiver unit 130 will be described by way of numerical example.

In this example, a single-core optical fiber 110 is a step-index structured acrylic plastic optical fiber (POF) (e.g. PMMA-SI-POF) having a low-loss wavelength window of about 650 nm. The length of the single-core optical fiber 110 is 10 m. The first light emitting element 121 of the optical transceiver unit 120 is an LED having a wavelength of 650 nm, and the light emitting element 131 of the optical transceiver unit 130 is a laser diode (LD) having a wavelength of 650 nm.

The amount of light transmitted from the optical transceiver unit 120 to the single-core optical fiber 110 ranges from −9 to −2 dBm, i.e. TAmin–max=(−9--2) dBm. The light loss La in the single-core optical fiber 110 during the transmission through it is 0.5 dB/m. The reception loss, which is the amount of light exiting the single-core optical fiber 110 and lost before entering the light receiving element 133, is 5 dB. Of the signal light S (dBm) transmitted from the optical transceiver unit 120, the amount of light S received (i.e. detected) by the light receiving element 133 is obtained by substituting these values in Equation (6), as follows.

$$S = (-9 - -2) - 0.5 * 10 - 5 = (-19 - -12) \text{ dBm} \quad (11)$$

On the other hand, the amount of light transmitted from the optical transceiver unit 130 to the single-core optical fiber 110 is in the range from −9 to −2 dBm (before adjustment by the light emission adjusting unit 140); the loss due to attenuation in the single-core optical fiber 110 during the transmission through it is 0.1 dB/m; and the loss due to reflection at the distal end of the single-core transmission fiber 110, resulting in optical crosstalk is 15 dB. Of the light transmitted from the optical transceiver unit 130 to the optical transceiver unit 120, the amount of light reflected back and detected as FX (dBm) by the light receiving element 133, is found to be $$FX = (-9 - -2) - 2 * 0.1 * 10 - 15 - 5 = (-31 - -24) \text{ dBm} \quad (12)$$

Of the light reflected at the proximal end of the single-core optical fiber 110, the amount of light lost before it is received by the light receiving element 133 is 30 dB. Thus, of the signal light emitted from the optical transceiver unit 130 to the optical transceiver unit 120, the amount of NX-talk, NX (dBm), which is due to the reflection of the transmitted signal light at the proximal end of the single-core optical fiber and detected by the light receiving element 133 of the optical transceiver unit 130, is found to be $$NX = (-9 - -2) - 30 = (-39 - -32) \text{ dBm} \quad (13)$$

Hence, the total crosstalk component X (dBm) detected by the light receiving element 133 amounts to $$X = 10 * \text{LOG} (10^\wedge(-3.1--2.4) + 10^\wedge(-3.9--3.2)) = (-30 - -23) \, dBm \quad (14)$$

Consequently, in the worst case, the S/X ratio of the received signal component to the optical crosstalk component is as follows:

$$S/X = S\text{min} - X\text{max} = (-19 - -23) = 4 \text{ dB} \quad (15)$$

It is seen that the S/X ratio can be at best 4 dB, since the attenuation rate, during transmission through the single-core optical fiber 110, of light transmitted from the light emitting element (LED) 121 is larger (0.5 dB/m) than that (0.1 dB/m) of light transmitted from the light emitting element (laser diode) 131, Smin decreases while Xmax increases.

Suppose now that the maximum amount of light transmitted from the light emitting element 131 to the single-core optical fiber 110 is reduced from −2 dBm to −4 dBm by the light emission adjusting unit 140 (see FIG. 10). Then the amount of light that couples with the single-core optical fiber 110 will be in the range from −9 dBm to −4 dBm.

With this adjustment, amounts of crosstalk FX (dBm), NX (dBm), and X (dBm) will be $$FX = (-9 - -4) - 2 * 0.1 * 10 - 15 - 5 = (-31 - -26) \text{ dBm} \quad (16)$$

$$NX = (-9 - -4) - 30 = (-39 - -34) \text{ dBm} \quad (17) ps$$

$$X = 10 * \text{LOG}(10 \wedge (-3.1 - -2.6) + 10 \wedge (-3.9 - -3.4)) \quad (18)$$
$$= (-30 - -25) dBm$$

and the signal to crosstalk ratio S/X will be $$S/X = S\text{min} - X\text{max} = (-19 - -25) = 6 \text{ dB} \quad (19)$$

These post-adjustment values are indicated In FIG. 12, next to corresponding pre-adjustment values marked with crosses.

It is seen that Xmax is reduced by 2 dBm, ensuring 6 dB for S/X ratio. When the S/X ratio is 6 dB, optical transmissions of several hundred Mbps can be maintained if the reception eye pattern is superposed with a general Gaussian noise.

In the example described above, although the S/X ratio has been improved by limiting only the maximum emission level TBmax of the optical transceiver unit 130 is reduced to TBmax', the S/X ratio can be improved equally well by increasing the minimum emission level of the light emitting element 121 of the optical transceiver unit 120. This is due to the fact that Smin then increases in Equation (10). Apparently, the S/X ratio may be improved by both reducing the maximum emission level of the optical transceiver unit 130 and increasing the minimum emission level of the optical transceiver unit 120.

Alternatively, instead of reducing the maximum emission level of the optical transceiver unit 130 from TBmax to TBmax' as in the embodiment described above, the second light emitting element 131 may be adjusted such that the amount of light TBmax-min emitted therefrom as a whole is downwardly shifted. In this case, however, the minimum amount of the signal light component received by the light receiving element 123 is also reduced, so that the signal-to-crosstalk ratio S/X is somewhat deteriorated. Similarly, in improving the S/X ratio in the transmission from the optical transceiver unit 120 to the optical transceiver unit 130, the light emitting element 121 may be adjusted so as to upwardly shift the amount of emission TAmin–max emitted from the first light emitting element 121 as a whole.

Although the invention has been described with reference to a particular embodiment utilizing a POF as the single-core optical fiber 110, it will be understood by a person of ordinary skill that the invention may be applied equally well to embodiments utilizing other types of single-core optical fibers 110 including a glass optical fiber (GOF).

As describe above, the invention reduces optical crosstalk component involved in a duplex optical communication system by adjusting the amount(s) of light transmitted between the first and the second optical transceiver units of the system without requiring optical wavelength-separation elements or a costly large scale optical transceiver units. Since the invention does not utilize wavelength separation elements, optical crosstalk can be effectively reduced if the wavelengths of the light emitted from the respective optical transceiver units are the same. Because of such capability of reducing optical crosstalk component, stable full duplex communications may be established irrespective of the types of the light emitting elements used in the first and the second light transmission units and light losses resulting in therefrom.

Thus has been shown and described various embodiments of a full duplex optical communication system in accordance with the invention suitable for an optical communication system for performing full duplex communication connecting a first and a second optical transceiver units connected with each other by means of a single-core optical fiber. While the foregoing specification has described preferred embodiments of the present invention, one skilled in the art may make many modifications to each of the preferred embodiments without departing from the invention in its broader aspects. The appended claims therefore are intended to cover all such modifications as fall within the true scope and spirit of the invention.

What is claimed is:

1. A full duplex optical communication system, comprising a first and a second optical transceiver units connected with each other by means of a single-core optical fiber, said first optical transceiver unit including:

a first light emitting element for emitting transmission light;

a first light receiving element for receiving signal light; and first guiding means for guiding said transmission light from said first light emitting element to said single-core optical fiber and for guiding received signal light from said single-core optical fiber to said first light receiving element, and said second optical transceiver unit including:

a second light emitting element for emitting transmission light;

a second light receiving element for receiving signal light; and second guiding means for guiding said transmission light from said second light emitting element to said single-core optical fiber and for guiding received signal light from said single-core optical fiber to said second light receiving element, said optical communication system further comprising:

means for reducing optical crosstalk component relatively, wherein said optical crosstalk component being at least one of the optical crosstalk component originating from said first light emitting element and contained in said signal light received by said first light receiving element and the optical crosstalk component originating from said second light emitting element and contained in said signal light received by said second light receiving element, by adjusting at least one of the amounts of transmission light emitted from said first and second light emitting elements to said single-core optical fiber, and wherein said first and second light emitting elements emit the transmission light having different spectral width in wavelength.

2. The optical communication system according to claim 1, wherein said first and second light emitting elements emit the transmission light which has different transmission loss rates in said single-core optical fiber.

3. The optical communication system according to claim 2, wherein said first and second light emitting elements emit the transmission light having different wavelength variations.

4. The optical communication system according to claim 2, wherein said first and second light emitting elements emit the transmission light having different wavelengths.

5. The optical communication system according to claim 2, wherein the launched numerical aperture (LNA) of said single-core optical fiber for the transmission light emitted from said first light emitting element differs from that for said second light emitting element.

6. The optical communication system according to claim 1, wherein said first light emitting element is a light emitting diode and said second light emitting element is a laser diode.

7. The optical communication system according to claim 1, wherein when transmission loss of the transmission light emitted from the light emitting element of one of said first and second optical transceiver units in said single-core optical fiber is larger than the corresponding loss of light emitted from the light emitting element of the other optical transceiver unit, said means for reducing optical crosstalk component is adapted to reduce the amount of light emitted from said light emitting element of said other optical transceiver unit to relatively reduce the amount of crosstalk component in the signal light received by the light receiving element of said other optical transceiver unit.

8. The optical communication system according to claim 7, wherein an amount of the transmission light emitted from said light emitting element of said other optical transceiver unit to said single-core optical fiber is variable; and wherein said means for reducing optical crosstalk component is adapted to reduce only the maximum amount of light emitted from said light emitting element of said other optical transceiver unit to thereby relatively reduce said crosstalk component in the light received by said light receiving element of said other optical transceiver unit.

9. The optical communication system according to claim 1, wherein when transmission loss of the transmission light emitted from the light emitting element of one of said first and second optical transceiver units in said single-core optical fiber is larger than the corresponding loss of light emitted from the light emitting element of the other optical transceiver unit, said means for reducing crosstalk component is adapted to increase the amount of light emitted from said light emitting element of said one optical transceiver unit to relatively reduce the amount of crosstalk component in the light received by said light receiving element of said other o ptical transceiver unit.

10. The optical communication system according to claim 9, wherein an amount of the transmission light emitted from said light emitting element of said other optical transceiver unit to said single-core optical fiber is variable; and wherein said means for reducing crosstalk component is adapted to increase only the minimun amount of light emitted from said light emitting element of said one optical transceivewr unit to thereby relatively reduce said crosstalk component in the light received by said light receiving element of said other optical transceiver unit.

\* \* \* \* \*